E. T. BOND.
FOLDING CRATE.
APPLICATION FILED AUG. 9, 1918.

1,318,532.

Patented Oct. 14, 1919.
2 SHEETS—SHEET 1.

Witness
Milton Lenoir

Inventor
Edgar T. Bond,
Adams Jackson
Attorneys

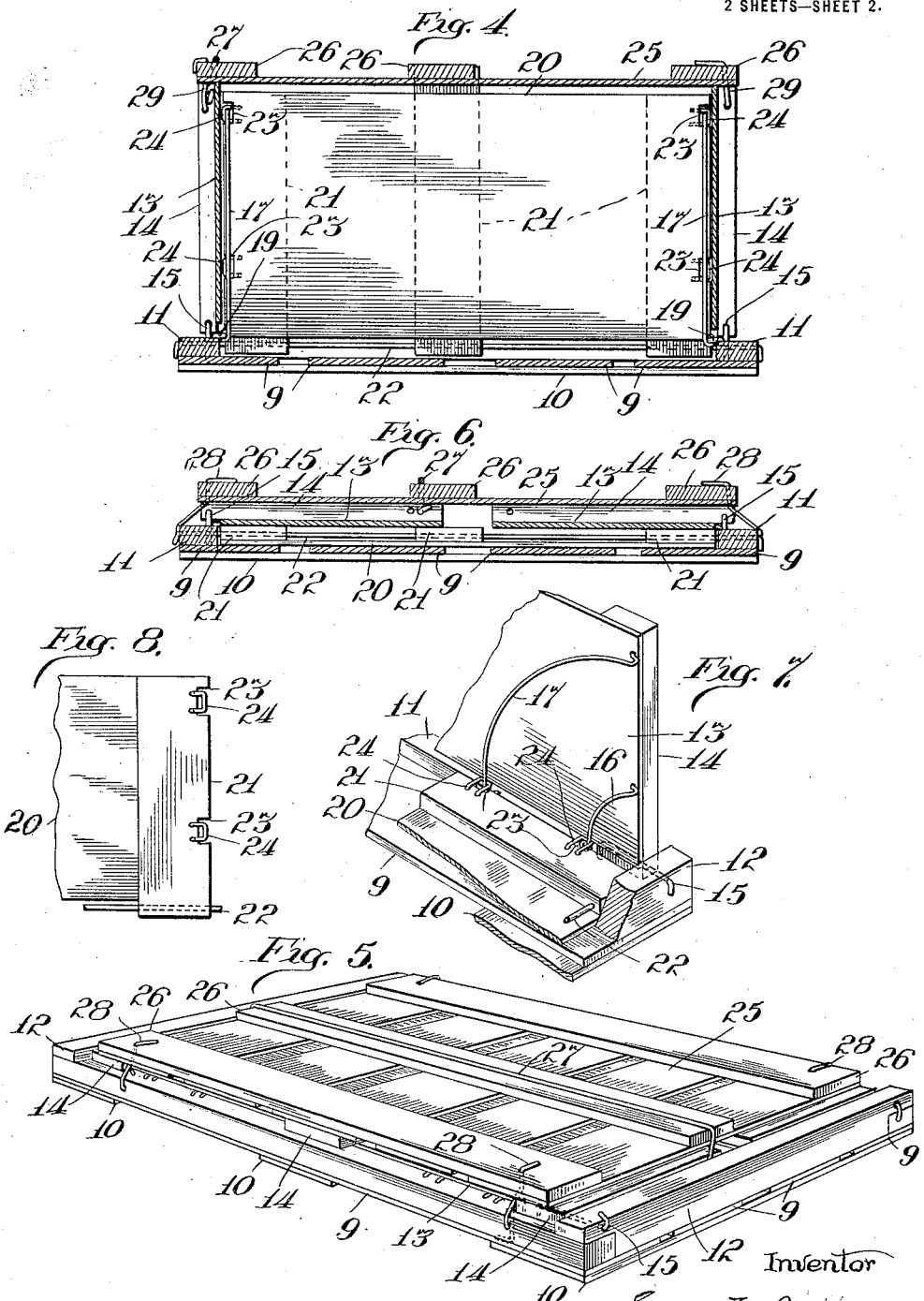

UNITED STATES PATENT OFFICE.

EDGAR T. BOND, OF CHICAGO, ILLINOIS.

FOLDING CRATE.

1,318,532.     Specification of Letters Patent.     Patented Oct. 14, 1919.

Application filed August 9, 1918. Serial No. 249,119.

*To all whom it may concern:*

Be it known that I, EDGAR T. BOND, a citizen of the United States, and a resident of Chicago, in the county of Cook and State of Illinois, have invented certain new and useful Improvements in Folding Crates, of which the following is a specification, reference being had to the accompanying drawings.

My invention relates to folding boxes or crates, and has for its object to provide an article of that description which will be light and yet strong and substantial so that it will be suitable for use in shipping articles of considerable weight as well as lighter merchandise, or fruits, poultry, eggs, etc. Also to provide a construction which may be cheaply manufactured and easily repaired. I accomplish this object as illustrated in the drawings and as hereinafter described. What I regard as new will be set forth in the claims.

In the accompanying drawings:

Fig. 4 is a vertical cross section on line 4—4 of Fig. 2;

Fig. 5 is a perspective view of the crate folded with the cover attached;

Fig. 6 is a cross section of the folded crate and cover;

Fig. 7 is a perspective view similar to Fig. 3, showing one of the ends of the crate in its folded position; and Fig. 8 is a detail, being an elevation of part of one of the ends of the crate.

Figure 1:
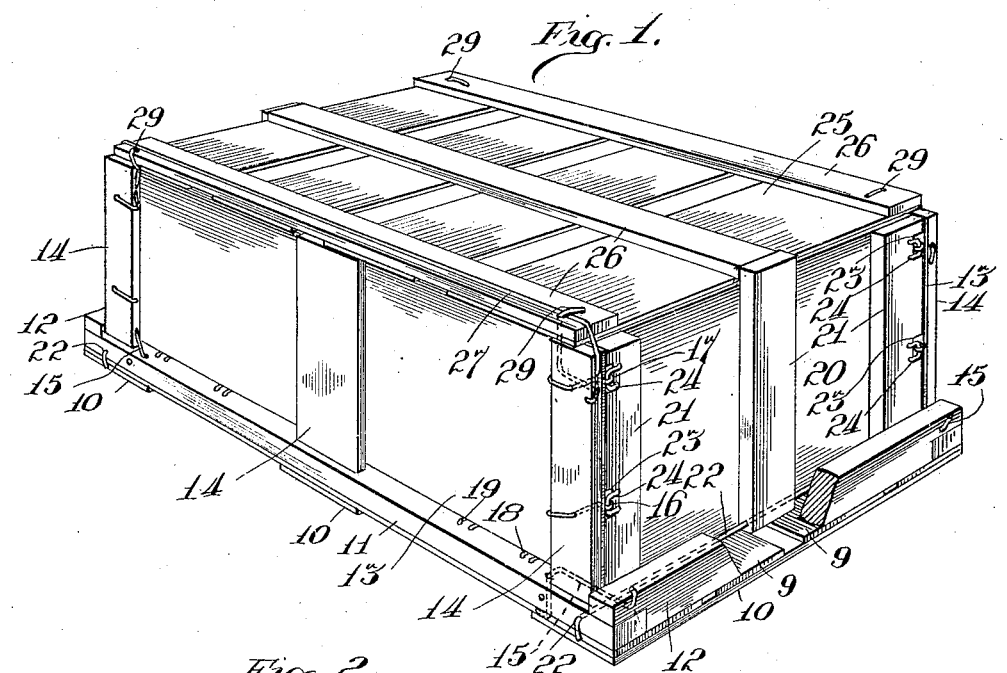
Figure 1 is a perspective view of a crate embodying my invention with the cover in place, part of one end strip being broken away.
Figure 2:
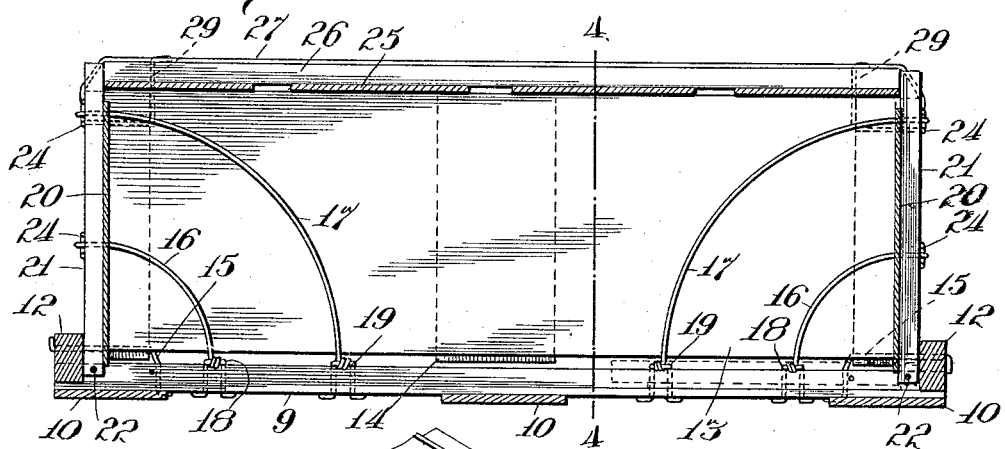
Fig. 2 is a longitudinal vertical section thereof.

Referring to the drawings: 9 indicates the bottom boards of the crate which are connected by transverse battens 10 to form a rigid bottom which is rectangular in shape. It will be understood, of course, that instead of using a number of boards or strips 9, the bottom may be made of a single piece, depending upon whether a comparatively tight box or a crate is required. On its upper side the bottom is provided with side strips 11 along its side margins, and with cross strips 12 at its ends, the latter being rabbeted to fit over the ends of the side strips 11, as shown in Fig. 1. These strips are permanently secured to the bottom in any suitable way. 13 indicates the sides of the crate which may be made either of single boards provided with battens 14, or may be made of separated strips. The sides are hinged to the bottom by means of wires 15 which pass through suitable perforations in the end strips and through registering perforations through the lower portions of the end battens 14, and thence down through the side strips 11, as illustrated in Figs. 1–2. The wire hinges 15 are secured in position by bending over their ends as indicated, and they may be readily withdrawn by straightening one of the bent ends, thereby permitting the removal of the sides. Should one of the hinges break, it will be obvious that it may easily be replaced. As shown in Fig. 2, the sides 13 are mounted so that when turned into a position perpendicular to the bottom, their lower margins are slightly above the upper surface of the side strips 11.

Figure 3:
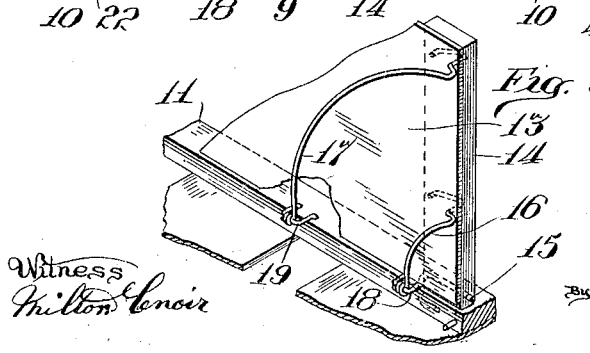
Fig. 3 is a detail, being a perspective view showing the manner in which the guide wires are attached.

16—17 indicates curved flexible guide rods or wires, provided at the end portions of the box adjacent to the sides 13. The lower ends of said guides are hinged or pivoted upon staples 18—19, respectively, secured in the side strips 11 so that their upper or looped ends are above the upper surface of said side strips. These loops are bent over inwardly, as shown in Fig. 3, so that they project beyond the inner margins of said side strips and thereby hold the lower ends of the guide rods 16—17 approximately in the plane of the inner faces of the sides 13. The ends of the staples 18—19 extend below the side strips 11 and are bent over to secure them in position, as shown in Fig. 2. Thus, when desired, said staples may easily be removed and replaced. The upper ends of the guide rods 16—17 extend through perforations in the ends of the sides 13 and the end battens 14, as shown in Fig. 3, and are secured by bending them over upon the outer surfaces of said battens. This provides convenient means by which said guide rods may be adjusted to take up any undesirable slack.

It will be noted that as the upper ends of the guide rods 16—17 are secured to the sides 13 of the crate, when said sides are swung in folding them or in moving them into operative position, the guide rods swing with the sides, their lower ends turning upon the staples 18—19 after the manner of hinges.

20 indicates the ends of the crate which are also provided with battens 21. Said ends are adapted to fit between the sides 13, and are hinged to the bottom by means of wires or rods 22, the ends of which are secured in the end portions of the side strips 11, as shown in Fig. 1. Thus, the ends 20 may be swung about the rods 22 as a pivot into either their folded or their upright position. When in the latter position the ends lie between the sides of the crate, and hold the latter against inward movement. At their side margins the ends 20 are provided with notches 23 which also extend through the end battens 21, said notches being placed so as to register with the guide rods 16—17, as shown in Figs. 1 and 8, and they are also provided with staples 24, the loops of which extend over said notches, as shown in Fig. 8, and embrace the guide rods 16—17, as shown in Fig. 1. By this construction, when the ends of the crate are swung in either direction, the staples 24 run along the guide rods 16—17, as will be apparent from a comparison of Figs. 2 and 7. The guide rods 16—17 coöperate with the ends 20 to hold the sides 13 from spreading or bulging, and materially strengthen the crate. While I prefer to provide two of such guide rods at each end of the crate, it should be understood that my invention is not limited to using two, but contemplates using one or more of such guide rods. As will be apparent from an inspection of Fig. 7, when the ends 20 are folded, the loops of the staples 24 lie below the hinges of the sides 13, and consequently do not interfere with the folding of the sides, which may then be turned down over the folded ends 20, as illustrated in Figs. 5—6.

25 indicates the top of the crate which is provided with longitudinally extended battens 26, and is adapted to fit upon the upper margins of the sides and ends. Preferably the intermediate battens 21 of the ends of the crate extend up above the upper margins of said ends into position to engage the ends of the intermediate batten 26 of the cover, as shown in Fig. 1, thereby preventing the ends from swinging inwardly in case the crate should not have been tightly packed. The cover 25 is loosely associated with the rest of the crate when the crate is folded by means of a wire bail 27, the ends of which are pivotally secured in the upper ends of the end battens 14 of one of the sides, as shown in Figs. 1 and 5, said bail being of such length that when the crate is folded the cover will fit snugly under it, and may be firmly secured by means of wires 28 carried by the side strips 11 by passing said wires through holes in the cover and bending them over upon the edges of the cover as shown in Fig. 5. When the crate is packed the cover may be secured in position in the same way by wires 29 provided for that purpose, as shown in Fig. 1.

By the construction described I provide a crate which may be made of inexpensive materials, as the boards making up the sides, ends, bottom and top may be of very thin cheap stuff. The crate is, notwithstanding, very strong and substantial, and may be used for shipping comparatively heavy articles, as well as for light merchandise, and other things such as eggs, poultry, etc. When unloaded, it may very easily be folded into compact form for storage or for shipping. In describing my improved device as a crate, I wish it to be understood that I have not intended to limit the invention to crates only, but have used that term in a generic sense to include similar containers, whether they be of open-work or of comparatively tight construction.

In the foregoing description I have used the term "sides" to indicate the folding members to which the guide rods or wires are connected, because in the illustration they are longer than the members termed the "ends", but those terms are relative merely, as obviously the members to which the guide rods are connected may be shorter than the others, or they may be of the same length. The construction shown is, however, preferred.

What I claim as my invention and desire to secure by Letters Patent, is:—

1. A folding crate comprising a bottom, and side and end members, the end members being hinged to the bottom so as to fold over thereupon, and the side members being hinged to fold over upon the folded end members, and guides connected at their lower ends with the bottom of the box and at their upper ends with the end portions of the side members, said end members having sliding engagement with said guides.

2. A folding crate comprising a bottom, and side and end members, the end members being hinged to the bottom so as to fold over thereupon, and the side members being hinged to fold over upon the folded end members, and guides pivotally connected at their lower ends with the bottom of the box and connected at their upper ends with the end portions of the side members, said end members having sliding engagement with said guides.

3. A folding crate comprising a bottom, and side and end members, the end members being hinged to the bottom so as to fold over thereupon, the side members being hinged to fold over upon the folded end members, and guides connected at their lower ends with the bottom of the box and adjustably connected at their upper ends with the end portions of the side members, said end members having sliding engagement with said guides.

4. A folding crate comprising a bottom, and side and end members, the end members being hinged to the bottom so as to fold over thereupon, and the side members being hinged to fold over upon the folded end members, and guides pivotally connected at their lower ends with the bottom of the box and adjustably connected at their upper ends with the end portions of the side members, said end members having sliding engagement with said guides.

5. A folding crate comprising a bottom, and side and end members, the end members being hinged to the bottom so as to fold over thereupon, and the side members being hinged to fold over upon the folded end members, and guide rods connected at their lower ends with the bottom of the box and at their upper ends with the end portions of the side members, said end members having sliding engagement with said guide rods.

6. A folding crate comprising a bottom, and side and end members, the end members being hinged to the bottom so as to fold over thereupon, and the side members being hinged to fold over upon the folded end members, and guide rods hinged at their lower ends to the bottom of the box and connected at their upper ends with the end portions of the side members, said end members having sliding engagement with said rods.

7. A folding crate comprising a bottom, and side and end members, the end members being hinged to the bottom so as to fold over thereupon, and the side members being hinged to fold over upon the folded end members, guide rods connected at their lower ends with the bottom of the box and at their upper ends with the end portions of the side members, and loops carried at the side margins of the end members embracing said guide rods.

8. A folding crate comprising a bottom, and side and end members, the end members being hinged to the bottom so as to fold over thereupon, and the side members being hinged to fold over upon the folded end members, guide rods connected at their lower ends with the bottom of the box and at their upper ends with the end portions of the side members, and loops carried at the side margins of the end members embracing said guide rods, the end members having notches which register with said loops.

9. A folding crate comprising a bottom, and side and end members, the end members being hinged to the bottom so as to fold over thereupon, and the side members being hinged to fold over the end members, and a plurality of guides adjacent to each end of the side members, said guides being connected at their lower ends with the bottom of the box and at their upper ends with the end portions of the side members, the end members having sliding engagement with said guides.

10. A folding crate comprising a bottom, and side and end members, longitudinal strips at the side margins of the bottom, said side members being hinged over said longitudinal strips and adapted to fold over the bottom of the box, said end members being hinged to the bottom of the box so as to fold over thereupon between said side members, and guides connected at their lower ends with said longitudinal strips and at their upper ends with the end portions of the side members, said end members having sliding engagement with said guides.

11. A folding crate comprising a bottom, and side and end members, longitudinal strips at the side margins of the bottom, said side members being hinged over said longitudinal strips and adapted to fold over the bottom of the box, said end members being hinged to the bottom of the box so as to fold over thereupon between said side members and guides pivotally connected with the end portions of said longitudinal strips and connected at their upper ends with the end portions of the side members, the end members having sliding engagement with said guides.

12. A folding crate comprising a bottom, and side and end members, side and end strips secured to the bottom along its margins, wires pivotally connecting the side members with said end strips, rods pivotally connecting said end members with said side strips whereby said end members may fold over the bottom and the side members over said end members, and means connecting said side and end members in both their folded and their open positions.

13. A folding crate comprising a bottom, and side and end members, side and end strips secured to the bottom along its margins, wires pivotally connecting the side members with said end strips, rods pivotally connecting said end members with said side strips, and guide rods pivotally connected with said side strips and with the end portions of said side members, said end members having sliding engagement with said guide rods.

14. A folding crate comprising a bottom, and side and end members, the end members being hinged to the bottom so as to fold over thereupon, and the side members being hinged to fold over upon the end members, and guide rods connected with opposite side members and swinging therewith when said side members are folded, said guide rods being anchored only at their ends, whereby the intermediate portions of said guide rods are detached from the inner faces of said side members, and means carried by said end members adapted to embrace and slide along said guide rods when the end members are folded.

EDGAR T. BOND.